United States Patent [19]
Sasaki et al.

[11] Patent Number: 5,484,651
[45] Date of Patent: Jan. 16, 1996

[54] FLUORINE-CONTAINING POLYOLEFIN NON-WOVEN FABRIC AND METHOD OF MANUFACTURING THE SAME

[75] Inventors: Koshi Sasaki, Kawasaki; Hidehiko Ohara, Yokohama; Naoshi Imaki, Atsugi, all of Japan

[73] Assignee: Mitsubishi Chemical Corporation, Tokyo, Japan

[21] Appl. No.: 253,277

[22] Filed: Jun. 2, 1994

[30] Foreign Application Priority Data

Jun. 2, 1993 [JP] Japan .................. 5-131967
Oct. 26, 1993 [JP] Japan .................. 5-267219

[51] Int. Cl.$^6$ .................. B32B 33/00; D06M 11/09; H01M 2/16
[52] U.S. Cl. .................. 428/224; 8/115.54; 8/149.2; 428/288; 429/250; 429/251
[58] Field of Search .................. 8/149.2, 115.54; 428/224, 288; 429/250, 251

[56] References Cited

U.S. PATENT DOCUMENTS 3,940,520  2/1976  Dixon et al. .
3,988,491  10/1976  Dixon et al. .
4,020,223  4/1977  Dixon et al. .

OTHER PUBLICATIONS

Patent Abstracts of Japan, JP-A-2 276154, Nov. 13, 1990.
Patent Abstracts of Japan, JP-A-60 109171, Jun. 14, 1985.
Patent Abstracts of Japan, JP-A-2 087460, Mar. 28, 1990.

*Primary Examiner*—James C. Cannon
*Attorney, Agent, or Firm*—Oblon, Spivak, McClelland, Maier & Neustadt

[57] ABSTRACT

A fluorine-containing, polyolefin fiber non-woven fabric having enhanced resistance to degradation when exposed to a potassium hydride solution is produced by exposing a polyolefin fiber non-woven fabric to a gaseous atmosphere comprising $F_2$ and $O_2$ gases in certain volumetric ratios.

10 Claims, 1 Drawing Sheet

FLUORINE-CONTAINING POLYOLEFIN NON-WOVEN FABRIC AND METHOD OF MANUFACTURING THE SAME

BACKGROUND OF THE INVENTION

The present invention relates to a fluorine-containing polyolefin non-woven fabric and a method of manufacturing such fabric. The present invention also relates to a separator for a cell using the fabric of the type described.

Commonly available non-woven fabrics are made of fibers including natural and synthetic ones. The individual fibers have advantages as well as disadvantages. For example, non-woven fabrics of nylon fibers are superior in hydrophilic nature, dying properties, and printability. These fibers are, however, inferior in chemical resistance, solvent resistance, and weathering resistance. On the contrary, non-woven fabrics of polyolefin fibers are superior in the chemical resistance, the solvent resistance, and the weathering resistance, which are disadvantageously inferior in the hydrophilic nature, the dying properties, and the printability. Accordingly, development of a non-woven fabric has been desired that is superior in the chemical resistance, the solvent resistance, and the weathering resistance and has good hydrophilic nature, dying properties, and printability as well.

One application of the conventional non-woven fabric is a separator for a cell. Typical separators may be a nylon non-woven fabric or a polyolefin porous film. However, when used as the separator for a nickel-hydrogen cell or a nickel-zinc cell using an alkali solution as the electrolyte, the fabric should be highly hydrophilic and have superior alkali resistance.

For the conventional separator of this type has been used a polyolefin non-woven fabric which is sulfonated to impart the hydrophilic nature. However, this sulfonated polyolefin non-woven fabric is insufficient in view of the alkali resistance. Alternatively, the polyolefin non-woven fabric may be modified by treatment with other materials. For example, Japanese Patent Publication No. 59-5601 discloses to impart the hydrophilic nature to the polyolefin non-woven fabric by means of surface treatment with a mixture of fluorine gas and oxygen gas. Japanese Patent Publication Nos. 4-7548 and 5-46056 disclose the use of the non-woven fabric so treated as a separator for a cell. These fabrics are, however, also insufficient in view of the alkali resistance.

With these respects, the present inventors have been made tremendous studies to overcome the above mentioned problems. As a result, it has been found that a fluorine-containing polyolefin non-woven fabric where the numbers of carbon, oxygen, and fluorine atoms of a surface elemental composition are in a certain relation is superior in the chemical resistance, the solvent resistance, and the weathering resistance and has good hydrophilic nature, dying properties, and printability as well. It has also been found that the fluorine-containing polyolefin non-woven fabric of the type described has the superior alkali resistance. The present invention was thus completed.

SUMMARY OF THE INVENTION

According to an aspect of the present invention, it is provided with a fluorine-containing polyolefin non-woven fabric, wherein the numbers of carbon (C), oxygen (O), and fluorine (F) atoms in a surface elemental composition satisfies the formulae:

$$0.6 \geq F/C \geq 0.01 \quad (1),$$

and $$100 \geq (10 \times O - F)/C \geq 1.4 \quad (2),$$

the surface elemental composition being measured by the electron spectroscopy for chemical analysis (ESCA).

A method of manufacturing the fluorine-containing polyolefin non-woven fabric is also provided.

DETAILED DESCRIPTION OF THE INVENTION

Figure 1:
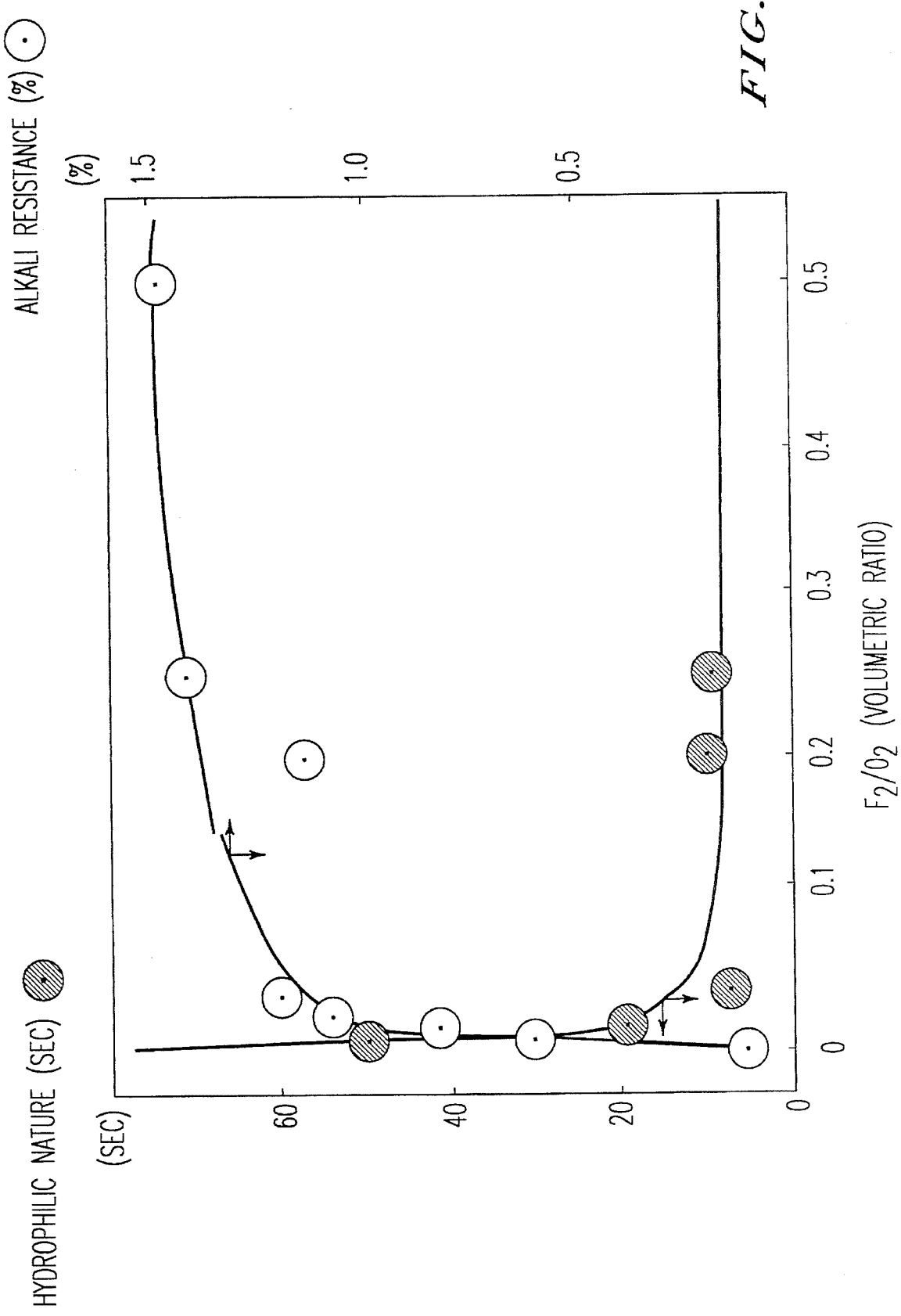
FIG. 1 shows the hydrophilic nature and the alkali resistance as a function Of $F_2/O_2$ (volumetric ratio) in Examples 3 through 7 and Comparative Example 2 through 3.

The present invention is described more in detail below.

The non-woven fabric according to the present invention is made of polyolefin fibers having surfaces modified by treatment with a mixed gas of fluorine, oxygen and others. More specifically, the fluorine-containing polyolefin non-woven fabric of the present invention is imparted with superior hydrophilic nature, dying properties, printability, and bonding properties without deteriorating good properties of polyolefin fibers including chemical resistance, solvent resistance, weathering resistance, mechanical strength, and thermal resistance.

The fluorine-containing polyolefin non-woven fabric having such properties may find its application in various fields. For example, the fabric may be used industrially as filter cloth or filters (for filtering chemical agents, paints, gases, beer, wine, milk, and so on), supports for coated fabric, separators for cells, fabric tapes, fabric labels, and wrapping materials; medical and sanitary products such as eye bandages, dressings, pads, masks, and towels; and household products such as wall papers, aprons, sheets, blankets, tablecloth, and napkins.

Of these, the separators for cells are preferable form of the fluorine-containing polyolefin non-woven fabric according to the present invention because it exhibits a remarkable alkali resistance. More specifically, the fabric of the present invention may be used as a separator for a cell such as a nickel-hydrogen cell, and a nickel-zinc cell.

In the fluorine-containing polyolefin non-woven fabric according to the present invention, the numbers of the carbon (C), oxygen (O), and fluorine (F) atoms are in following relations measured by ESCA:

$$0.6 \geq F/C \geq 0.01,$$

and $$100 \geq (10 \times O - F)/C \geq 0.4.$$

One feature of the present invention is a significantly small value of F/C as compared with conventional one. An unnecessarily high F/C value causes the fluorine atoms to act excessively on the surface of the polyolefin. This increases water repellency and significantly deteriorates the alkali resistance. On the other hand, only the insufficient hydrophilic nature can be achieved with the F/C value of smaller than 0.01 because the fluorine gas contacting with the polyolefin is not enough to modify the surface thereof.

When the value of (10×O−F)/C is smaller than 0.4, insufficient amount of oxygen-containing functional group is introduced into the surface of the non-woven fabric. Accordingly, the surface is not hydrophilic. In addition, the value of larger than 100 cause no more improvement of the effect thereof. Preferably, these values are:

$$0.6 \geq F/C \geq 0.03,$$

and $$50 \geq (10 \times O - F)/C \geq 0.6.$$

More preferably, these values are:

$$0.5 \geq F/C \geq 0.04,$$

and $$20 \geq (10 \times O - F)/C \geq 1.2.$$

The term "surface elemental composition measured by ESCA" used herein means a composition measured by using ESCA5500MC sold by Perkin Elmer Phi Co. under conditions of 14 kV and 150 W (by means of a monochromater; taking angle=65°) with an Al radiation source.

In the present invention, the O/C of the surface elemental composition measured by the ESCA preferably satisfies the following equation (3) for the application where high hydrophilic nature is required in, for example, a separator for a cell:

$$O/C \geq 0.2 \tag{3}.$$

With the O/C of smaller than 0.2, the hydrophilic nature required for the separator for a cell is insufficient, and is thus not preferable. The O/C is preferably 0.3 or larger.

When the non-woven fabric according to the present invention is used as the separator for a cell, loss in weight after immersed in a 30%-potassium hydride solution at 100° C. for 1 hour may be used as a measure of the alkali resistance. In this event, the loss in weight is preferably 1.4% by weight or less, and more preferably 1% by weight or less. The fabric of which loss in weight is more than 1.4% by weight has only insufficient alkali resistance and is thus unsuitable as the separator for a cell, in particular a nickel-hydrogen cell or a nickel-zinc cell, using an alkali solution as the electrolyte.

The fluorine-containing polyolefin non-woven fabric according to the present invention may be obtained by means of treating polyolefin fibers of before or after being formed into the non-woven fabric with a mixed gas containing fluorine and oxygen (hereinafter, merely referred to as a mixed gas).

The polyolefin fibers used here may preferably be hydrocarbon polyolefin fibers such as polyethylene or polypropylene by the chemical resistant, solvent resistant, and weathering resistant considerations.

In the present invention, the polyolefin fibers are surface treated with the mixed gas containing fluorine and oxygen. In this event, the stock fibers before formed into the non-woven fabric may be surface treated. Alternatively, the non-woven fabric itself may be surface treated. Considering simple procedure of treatment, the surface treatment is preferably made on the non-woven fabric.

As a simple and effective method of manufacturing the non-woven fabric having good hydrophilic nature, dying properties, and printability, the non-woven fabric or stock fiber is preferably contacted with gas containing a specific amount of fluorine ($F_2$) and oxygen ($O_2$). This contact treatment is described. It is necessary to use a mixed gas of which volumetric (or molar) ratio of fluorine and oxygen gases ($F_2/O_2$) is 0.2 or lower. The volumetric ratio of higher than 0.2 deteriorates the alkali resistance due to an excessive amount of the fluorine gas. In addition, the hydrophilic nature is also deteriorated because of lack of the oxygen gas. The volumetric ratio of $F_2/O_2$ is preferably 0.1 or lower, and more preferably in a range from 0.0001 to 0.05.

A ratio of the fluorine gas in the mixed gas is in a range from 0.01% to 20% by volume, preferably from 0.1% to 10% by volume, and more preferably from 0.5% to 5% by volume. The ratio of the fluorine gas of lower than 0.01% by volume is not preferable because the reaction between the fluorine and the non-woven fabric is not sufficient and hence the effect of surface treatment may be deteriorated or even a treatment spot may be caused. The ratio of the fluorine of higher than 20% by volume results in an excessive reaction, deteriorating the alkali resistance significantly. In addition, the hydrophilic effect may become less significant and a mechanical strength of the non-woven fabric may be deteriorated.

A content of the oxygen gas in the mixed gas is 15% by volume or higher, and more preferably in a range from 30% to 99% by volume. With a lower content of the oxygen, an insufficient amount of oxygen is introduced into the surface. This causes increase in the amount of the fluorine introduced. The fluorine causes the water repellency and thus a satisfactory level of hydrophilic nature cannot be achieved.

To use the mixed gas containing fluorine and oxygen for modifying the polyolefin surface to be hydrophilic is disclosed in, for example, Japanese Patent Publication No. 59-5601 (Air Products and Chemicals, Inc.). The specification says that the treatment condition includes the content of the oxygen gas of 5% by volume or lower. Accordingly, $F_2/O_2$ becomes approximately 0.5. The alkali resistance achieved by this method is significantly inferior to that obtained in the present invention. More specifically, the alkali resistance is 2% by weight based on the loss in weight after immersed in a 30%-potassium hydride solution at 100° C. for 1 hour.

In addition, Japanese Patent Publication No. 5-46056 and Japanese Patent Laid Open No. 60-109171 (Sanyo Electric Co.) disclose the non-woven fabric where the oxygen and fluorine contents in the fluorine-containing gas are 10% and 2.5%, respectively, by volume. The polypropylene is made hydrophilic under conditions of $F_2/O_2$ of 0.25. This condition causes, however, the fluorine to react excessively with the polyolefin surface, significantly deteriorating the alkali resistance.

The above mentioned patent application of Sanyo Electric Co. discloses that the hydrophilic nature can be improved with formation of a —$CF_2$— group by the above mentioned treatment. However, the hydrophilic nature is obtained with oxygen-containing functional groups such as =CO, —OH, or —$CO_2H$, and increase of the —$CF_2$— groups generally contributes to the water repellency. More specifically, with the content of the oxygen gas in the fluorine-containing mixed gas of less than 15% by volume, the value of (10×O−F)/C is 0.4 is larger by using values of C, F, and O in the surface elemental composition measured by ESCA. However, the condition that the value of F/C is 0.6 or smaller is not satisfied and thus the satisfactory level of hydrophilic nature cannot be achieved.

In addition, the fluorine gas improves the hydrophilic nature if present at a small amount. An excessive amount of the fluorine gas significantly deteriorates the alkali resistance. While the reason thereof has not been revealed clearly, a small amount of fluorine gas may activate the surface of the polyolefin and permit easy access of the oxygen to the surface. The excessively large amount of fluorine gas may attach the polyolefin surface unnecessarily and disturb the molecular arrangement, deteriorating the resistance of the surface.

In the present invention, the fluorine gas serves as a catalyst for oxygen introduction, so that a small amount of fluorine is enough. The effects of the present invention cannot be achieved with the excessively large amount of the fluorine gas.

The surface treatment with the above mentioned mixed gas according to the present invention increases a surface energy of the polyolefin non-woven fabric. The term "surface energy" of a solid used herein means physical amount on the surface of that solid, which can be one of indexes indicating to what degree solids are wet by liquids. More specifically, the wetting of solids by liquids reduces the surface free energy. The larger the difference between the surface tension of the solid and the solid-liquid interface tension is, the larger the degree of reduction is. Natural phenomenon occurs in a direction of the free energy reduction, so that the larger the difference of the tensions is, the more likely the surface is wet.

The surface tension of a solid becomes large with the larger surface energy inherent to the solid before being wet (Gibbs-Helmholtz relation), so that the larger the surface tension of the solid and also the surface energy of the solid before being wet is, the larger the amount of reduction of the surface free energy upon wetting is, and the solid is more likely to be wet.

The surface treatment in the present invention acts to increase the surface energy of the polyolefin non-woven fabric, which permits the surface of the non-woven fabric to be more wettable.

The polyolefin non-woven fabric is typically treated with the mixed gas at a temperature ranging from −50° C. to 90° C., preferably from −50° C. to 50° C., more preferably from 0° to 60° C. most preferably from 10° to 40° C. The time of treatment may be advantageously selected out of a large range, and is typically in a range from 1 second to 10 minutes, and preferably from 60 seconds to 8 minutes. The effects of the present invention cannot be achieved with the treatment performed for less than 1 second because of insufficient reaction.

According to the method of the surface treatment in the present invention, the polyolefin non-woven fabric is preferably treated by from 20 to 1000 Å in depth from the surface of the treated material, i.e., the fabric or the stock fiber.

A method of the surface treatment in the present invention, i.e., a method of contacting the non-woven fabric or its stock fiber with the mixed gas containing fluorine and oxygen, is not limited to a specific one. Examples of the method include a batch treatment and a continuous treatment. With the batch treatment, the non-woven fabric or its stock fiber is introduced into a sealed reaction vessel and the gas in the vessel is substituted by the gas containing fluorine and oxygen, thereby contacting the non-woven fabric or the stock fiber with the mixed gas.

With the continuous treatment, the non-woven fabric or the stock fiber thereof may be passed in a gas atmosphere containing fluorine and oxygen. In this event, the gas containing fluorine and oxygen is filled in a sealed vessel provided with an inlet and an outlet avoiding leakage of the gas therein. The non-woven fabric or the stock fiber may thus be continuously treated in the vessel. Alternatively, it may be possible to perform the contacting treatment by using a device avoiding leakage of the fluorine gas contained therein through a method of, for example, reducing a partial pressure of fluorine or through an air-curtain rather than using a sealed vessel.

The total pressure in the contact treatment on the non-woven fabric or the stock fiber thereof with the fluorine-containing gas may be an atmospheric pressure, a negative pressure, or a positive pressure. In any event, the only requirement is that the partial pressure or percentage by volume of fluorine and oxygen in the fluorine-containing gas satisfy predetermined conditions. The fluorine gas used in the present invention may be obtained through common electrolysis of liquid hydrogen fluoride. The fluorine gas obtained through the electrolysis may be used directly for the fluorine treatment. Alternatively, the fluorine gas may be introduced from a bomb, which may be single fluorine gas or a mixture of fluorine gas and other gas such as nitrogen gas.

In manufacturing the fluorine-containing polyolefin non-woven fabric according to the present invention, it is preferable that the polyolefin fiber is pre-treated to remove any lubricants or is dehydrated. Commercially available polyolefin non-woven fabrics may be pre-treated with a lubricant or the like. Presence of such lubricant is not preferable because $F_2$ is absorbed by it. In order to remove the lubricant previously, it is preferable that the polyolefin fiber is subjected to pre-treatment.

A content of the lubricant in the end product of the fluorine-containing polyolefin non-woven fabric is preferably 0.3% by weight or lower, and more preferably 0.1% by weight or lower.

It is preferable in the present invention to wet wash the non-woven fabric with hot water or alcohol as a post-treatment, thereby restricting the amount of $F_2$ consumed.

The fluorine-containing non-woven fabric that has good hydrophilic nature, dying properties, printability, and bonding properties can thus be obtained with the surface elemental composition where the number of the carbon (C), oxygen (O), and fluorine (F) atoms are in the above mentioned specific relation when measured by ESCA. In particular, the fluorine-containing polyolefin non-woven fabric is superior in the alkali resistance as well as the hydrophilic nature and is thus suitable for the separator of a cell.

The separator for a cell according to the present invention preferably has a METSUKE (weight per a unit area) of 100 g/m$^2$ or smaller, and more preferably 80 g/m$^2$ or smaller. In addition, a thickness of the separator is preferably in a range from 0.01 to 5 mm, and more preferably from 0.1 to 1 mm.

The present invention will be more readily apparent in the context of a specifically delineated set of examples. However, it should be understood that the present invention is not limited to those particular examples.

EXAMPLE 1

A polyethylene non-woven fabric about 0.2 g was introduced into a 2.5 lit. reaction vessel having resistance to fluorine, and the gas in the vessel was evacuated. Subsequently, a mixed gas was introduced into the reaction vessel where a ratio of the partial pressure of fluorine ($F_2$)/oxygen ($O_2$)/nitrogen ($N_2$) was 12/640/108 torr to achieve the pressure of 760 torr. The reaction vessel was stood at a room temperature for 5 minutes, the mixed gas was evacuated from the vessel, to which nitrogen gas was introduced to achieve the pressure of 760 torr. The sample was then removed from the vessel and a water permeable rate was measured, which was 3900 L/m².Hr.atm. The numbers of carbon (C), oxygen (O), and fluorine (F) atoms of the surface elemental composition was measured by using ESCA-5500MC sold by Perkin Elmer Phi Co. under conditions of 14 kV and 150 W (by means of a monochromater; taking angle=65°) with an Al radiation source. With these numbers, the value of (10×O—F)/C was calculated, which was 1.26. In addition, the value of F/C was 0.15 while the value of O/C was 0.14. The alkali resistance was 0.9% by weight and the rise of liquid was approximately 180 mm. The METSUKE of the non-woven fabric is 46 g/m² and the thickness is 0.2 mm.

The alkali resistance was determined as a loss in weight (wt. %) in the sample of 0.2 g after immersed in a 30 wt. % KOH solution at 100° C. for 1 hour. The rise of liquid was measured by using a slit-shaped sample of 2.5 cm wide. A lower end of the sample was immersed with 30 wt. % KOH solution in an atmosphere of 25° C. at relative humidity of 60% and the rise of liquid was measured 30 minutes later.

The water permeable rate of untreated polyethylene non-woven fabric was 4 L/m².Hr.atm. The value of (10×O—F)/C thereof was 1.24 while the F/C value was 0. The alkali resistance was 0.1% by weight and the rise of liquid was 0 mm.

In addition, the surface treated non-woven fabrics were immersed in aqueous solutions of 36N hydrochloric acid, 30% hydrogen peroxide, and 49% ammonium for 6 days. The water permeable rate of each sample was then measured. As a result, no change was observed on the appearance and the water permeable rate.

Comparative Example 1

Example 1 was repeated to treat the surface of a polyethylene non-woven fabric except that the ratio of the partial pressure of $F_2/O_2/N_2$ of the mixed gas was 250/400/110 torr. The water permeable rate after surface treatment was 3 L/m².Hr.atm. The value of (10×)—F)/C thereof was 0.50 while the F/C value was 1.20. The alkali resistance was 2.4% by weight and the rise of liquid was 40 mm.

EXAMPLE 2

Example 1 was repeated to treat the surface of a polyethylene non-woven fabric. The water permeable rate after surface treatment was 3080 L/m².Hr.atm. The value of (10×O—F)/C thereof was 2.78 while the F/C value was 0.32. The alkali resistance was 1% by weight and the rise of liquid was 160 mm.

In addition, the surface treated non-woven fabrics were immersed in aqueous solutions of 36N hydrochloric acid, 30% hydrogen peroxide, and 49% ammonium for 6 days. The water permeable rate of each sample was then measured. As a result, no change was observed on the appearance and the water permeable rate.

EXAMPLE 3

A polyethylene non-woven fabric was introduced into a reaction vessel having resistance to fluorine and the gas in the vessel was evacuated. Subsequently, a mixed gas was introduced into the reaction vessel where a ratio of the partial pressure of $F_2/O_2/N_2$ was 5/710/45 torr to achieve the pressure of 760 torr. The reaction vessel was stood at a room temperature for 5 minutes, the mixed gas was evacuated from the vessel, to which nitrogen gas was introduced to achieve the pressure of 760 torr. The sample was then removed from the vessel and the alkali resistance was measured in the same manner as in Example 1. In addition, as a measure of the hydrophilic nature, the sample of 10 by 10 cm was put into a beaker with water therein and a time interval for completely moistening the entire surface of the sample with change in color was measured. The alkali resistance was 0.6% by weight, and the hydrophilic nature was 50 seconds. $F_2/O_2$ was 0,007.

EXAMPLE 4

Example 1 was repeated to treat the surface of a polyethylene non-woven fabric except that the ratio of the partial pressure of $F_2/O_2/N_2$ of the mixed gas was 10/660/90 torr. $F_2/O_2$ was 0,015, the alkali resistance was 0.8% by weight, and the hydrophilic nature was 13 seconds.

EXAMPLE 5

Example 1 was repeated to treat the surface of a polyethylene non-woven fabric except that the ratio of the partial pressure of $F_2/O_2/N_2$ of the mixed gas was 20/560/180 torr. The alkali resistance was 1.2% by weight, and the hydrophilic nature was 10 seconds.

Comparative Example 2

Example 1 was repeated to treat the surface of a polyethylene non-woven fabric except that the ratio of the partial pressure of $F_2/O_2/N_2$ of the mixed gas was 20/80/660 torr. The water permeable rate after surface treatment was 6 L/m².Hr.atm. The value of (10×O—F)/C thereof was 2.10 while the F/C value was 0.90. The alkali resistance was 1.41% by weight and the rise of liquid was 55 mm. The hydrophilic nature was 10 seconds.

Comparative Example 3

Example 1 was repeated to treat the surface of a polyethylene non-woven fabric except that the ratio of the partial pressure of $F_2/O_2/N_2$ of the mixed gas was 20/40/700 torr. $F_2/O_2$ was 0.5, and the alkali resistance was 1.48% by weight.

EXAMPLE 6

Example 1 was repeated to treat the surface of a polyethylene non-woven fabric except that the ratio of the partial pressure of $F_2/O_2/N_2$ of the mixed gas was 20/100/640 torr. $F_2/O_2$ was 0.2, the alkali resistance was 1.14% by weight, and the hydrophilic nature was 10 seconds.

EXAMPLE 7

Example 1 was repeated to treat the surface of a polyethylene non-woven fabric except that the ratio of the partial pressure of $F_2/O_2/N_2$ of the mixed gas was 10/660/ 90 torr. $F_2/O_2$ was 0.02, and the alkali resistance was 1.06% by weight.

What is claimed is:

1. A fluorine-containing polyolefin non-woven fabric having a loss in weight of the non-woven fabric after being immersed in a 30%-potassium hydride solution at 100° for 1 hour of 1.4% by weight or less, wherein the numbers of carbon (C), oxygen (O), and fluorine (F) atoms in a surface elemental composition satisfies the formulae:

$$0.6 \geq F/C \geq 0.01 \qquad (1),$$

and $$100 \geq (10 \times O - F)/C \geq 0.4 \quad (2),$$

the surface elemental composition being measured by the electron spectroscopy for chemical analysis (ESCA), said fabric having been prepared by exposing the fabric to an atmosphere comprising a mixed gas of $F_2$ and $O_2$ whose volumetric ratio ($F_2/O_2$) is 0.2 or lower.

2. A non-woven fabric as claimed in claim 1, wherein the numbers of carbon (C) and oxygen (O) atoms in the surface elemental composition satisfies the formulae:

$$O/C \geq 0.2 \quad (3),$$

the surface elemental composition being measured by the electron spectroscopy for chemical analysis (ESCA).

3. A separator as claimed in claim 2, wherein the MET-SUKE of the non-woven fabric is 100 g/m² or smaller, and the thickness thereof is in a range from 0.01 to 5 mm.

4. A method of manufacturing a fluorine-containing polyolefin non-woven fabric having a loss in weight of the non-woven fabric after being immersed in a 30%-potassium hydride solution at 100° for 1 hour of 1.4% by weight or less, comprising the step of modifying surfaces of polyolefin fibers by treatment with a mixed gas containing fluorine and oxygen, the polyolefin fibers of before or after being formed into the non-woven fabric, a volumetric ratio of the fluorine and oxygen gases ($F_2/O_2$) being 0.2 or lower.

5. A method as claimed in claim 4, wherein a content of the oxygen gas in the mixed gas containing fluorine and oxygen is 15% by volume or higher.

6. A method as claimed in claim 4, wherein a content of the fluorine gas in the mixed gas containing fluorine and oxygen is in a range from 0.01% to 20% by volume.

7. A method as claimed in claim 4, wherein a treatment temperature ranges from −50° to 90° C.

8. A method as claimed in claim 4, wherein treating time ranges from 1 second to 10 minutes, both inclusive.

9. A method as claimed in claim 5, wherein the polyolefin non-woven fabric is treated by from 20 to 1000 Å in depth from the surface of the treated material.

10. A method as claimed in claim 5, wherein the non-woven fabric is subjected to wet wash with hot water or alcohol as a post-treatment.

* * * * *